United States Patent Office 3,378,532
Patented Apr. 16, 1968

3,378,532
POLYMER COMPOSITIONS HAVING AN
INCREASED MELT VISCOSITY
Gerhard Fritz, Krefeld, Karl-Heinz Hermann, Krefeld-Gartenstadt, and Hermann Schnell, Krefeld-Urdingen, Germany, assignors to Farbenfabriken Bayer Aktiengesellschaft, Leverkusen, Germany, a corporation of Germany
No Drawing. Filed Jan. 25, 1967, Ser. No. 611,565
Claims priority, application Germany, Sept. 21, 1963, 40,811; May 23, 1964, 42,966
6 Claims. (Cl. 260—78)

ABSTRACT OF THE DISCLOSURE

This specification describes a technique of increasing the melt viscosity of polyamide polymers. These polymers are set forth as exemplified by polyesteramides, polyurethanes and polyamides. The melt viscosity increasing material is suitably admixed with the polymer to form a composition which is melted and then formed into a shaped article. The melt viscosity improving materials are the ester reaction products of either carbonic acid or cycloaliphatic hydrocarbon dicarboxylic acids or aryl hydrocarbon dicarboxylic acids with phenols. Further, the carbonic acid ester may be the reaction product of carbonic acid with a polyhydric phenol or alcohol.

---

This invention relates to polymer compositions having an increased melt viscosity. The invention more particularly relates to a process for increasing the melt viscosity of polymers, such as polyamides, polyester amides, and polyurethanes, and to melts of these polymers having an increased viscosity.

Linear polyamides of a high molecular weight, such as poly-ε-caprolactam, and polyhexamethyleneadipamide, polyester amides, and polyurethanes generally when melted form thin liquids of a low melt viscosity. These low melt viscosity materials are not useful or only poorly suited for the manufacture of extruded shapes, tubes, deep-drawn articles, and large blow molded articles.

In order to overcome this disadvantage and to convert the polyamides, polyester amides, and polyurethanes to a form better suited for the above manufacturing techniques, such as blow molding, it is known to add compounds to the plastics which will increase the melt viscosity, i.e., the viscosity of the plastic when in a melted or fused state. These materials which are added to increase the melt viscosity of the plastics are generally cross-linking agents, which may be added during the condensation reaction by which the plastics are formed, and/or to the plastics after their formation, prior, or during their melting. Examples of cross-linking agents which may be added to the plastics after their formation and before or after their melting in order to increase the melt viscosity include compounds having at least two epoxy or isocyanate groups in the molecule, organic phosphorus compounds, peroxides, and bishaloalkylaryl compounds. Ethanol amides may, for example, be added to the raw materials for the manufacture of polyamides at the beginning of the poly condensation reaciton and linear polyesters of carbonic acid of high molecular weight can be added to the polyamides shortly before or after completion of the poly condensation.

These known cross-linking agents which are added to increase the melt viscosity of the polymers are not completely satisfactory. They may, for example, cause an excessively rapid and great increase in viscosity or form reaction or decomposition products which have an adverse influence on the quality of the plastics. Furthermore, the results obtained with the use of these known cross-linking agents is not always uniform or reproducible. When polyesters of carbonic acid are used to increase the melt viscosity, the degree of viscosity increase is greatly dependent not only on the amount used but also on its molecular weight and on the stage of the poly condensation reaction at which the addition takes place. The amounts required are also relatively high, generally amounting to about 1–5% by weight of the polyamide though in certain cases amounts as high as 10% by weight of the polyamide may be necessary.

One object of this invention is to increase the melt viscosity of polymers, such as polyamides, polyester amides, and polyurethanes without the above-mentioned disadvantages.

A further object of this invention is a method for increasing the melt viscosity of polyamides and polyester amides, and polyurethanes to a value rendering the same suitable for many manufacturing techniques, such as blow molding in a simple, unifirm, and reliable manner.

These and still further objects will become apparent from the following description:

It has now been found that the melt viscosity of polyamides, polyester amides, and polyurethanes may be increased in a uniform and reliable manner to a value rendering the polymers suitable for many further manufacturing techniques such as extrusion, blow molding, and the like by the addition of a small quantity of certain esters of carboxylic and carbonic acid. This group of esters comprises aryl esters of polyvalent carboxylic acids, aryl esters of carbonic acid, mixed carbonic acid esters containing polyhydric alcohol radicals, monohydric phenol radicals or polyhydric alcohol radicals, monohydric phenol radicals and polyhydric phenol radicals.

The starting polymers may be any of the known or conventional polyamides, polyester amides, or polyurethanes useful for the fabrication of plastic articles. The starting polymers are preferably linear polyamides of a high molecular weight, such as poly-ε-caprolactam, or polyhexamethylene adipamide. Polymers are produced in the well known and conventional manner by the condensation or polymerization reaction resulting in the formation of a polymer.

The aryl esters which may be used as cross-linking agents in accordance with the invention may be of the dibasic, cycloaliphatic, or aromatic carboxylic acids, or of carbonic acid. Certain dibasic aliphatic carboxylic acids have also been found to be useful.

Examples of arylesters of polyvalent carboxylic acids which may be used include sebacic acid diphenyl ester, terephthalic acid diphenyl ester, and isophthalic acid diphenyl esters.

Examples of esters of carbonic acid which may be used in accordance with the invention include diphenyl carbonate, bis - (4 - tert.butylphenyl) - carbonate, bis - 4-n - nonphenyl) - carbonate, cyclohexylcatechol carbonate, bisarylcarbonates of dihydroxyaryl compounds, such as dihydroxy-diaryl alkanes, and sulfides, etc. including specifically the bis-phenylcarbonates of 2,2-bis-(4-hydroxyphenyl) - propane, 2,2 - bis - (4 - hydroxy - 3 - isooctylphenyl) - propane, 2,2 - bis - (4 - hydroxy - 3,5 - dichlorophenyl) - propane, 4,4' - dihydroxy - 3,3' - diisooctyl - diphenylsulfide, and the like.

The mixed carbonic acid esters which may be used as melt viscosity increasing cross-linking agents may be any of the monomeric or polymeric mixed esters of carbonic acid which contain radicals of polyhydric aliphatic and cycloaliphatic, or araliphatic alcohols, and the radicals of monohydric and, if desired, of polyhydric phenols. The mixed esters of the carbonic acid may be formed from the corresponding polyhydric alcohols and monohydric or polyhydric phenols by transposing the chlorocarbonic acid esters of the one component with equivalent quantities of the other component in the presence of acid-binding agents such as pyridine or aqueous alkali with the addition, if desired, of catalysts such as tertiary amines or quaternary ammonium compounds. The reaction, if desired, may be effected in the presence of solvents, such as halogenated hydrocarbons, such as methylene chloride, chloroform, dichlorethane, etc. or of other solvents.

Examples of such polyhydric aliphatic alcohols which can be used in this case are: ethylene glycol, hexanediol-(1,6), 2,2 - dimethylpropanediol - (1,3), butanediol-(1,4), trimethylolpropane, glycerol, pentaerythritol, cyclohexane - diol - (1,4), 2,2 - bis - (4 - hydroxycyclohexyl)-propane, 2,2' - dihydroxydiethylether, 2,2' - dihydroxydiethylsulfide, terephthalic acid - bis - (2 - hydroxyethyl)-ester, bisphenol - A - bis - (2 - hydroxyethyl) - ether dihydroxymethylbenzene, etc.

Examples of phenols which may be used include phenol, 4 - tert.butylphenol, 4 - nonylphenol, 3 - pentadecylphenol, 4 - hydroxybenzoic acid ethyl ester, β - naphthol, halogen - substituted phenols, 4 - methoxyphenol, dihydroxydiarylalkanes, bisphenol - A; also, 4,4' - dihydroxydiphenylsulfide, etc.

If the above-named compounds are transposed with one another through the corresponding chlorocarbonic acid esters, either monomeric or polymeric mixed carbonic acid esters are obtained, depending on the number of groups present which are capable of reaction.

The linear polyamides were prepared by polymerizing or condensation of amino carboxylic acids, lactams or equivalent amounts of a dicarboxylic acid and a diamine.

Suitable compounds are aminoundecanoic acid, p-aminobenzoic acid, α-pyrrolidone, α-piperidone, ε-caprolactam, ω-oenanthlactam, ω-capryllactam, ω-lauryllactam. The following dicarboxylic acids may be used: succinic acid, glutaric acid, adipic acid, pimelic acid, sebacic acid, suberic acid, azelaic acid, isophthalic acid, terephalic acid, In connection with these carboxylic acids the following diamines may be used: ethylenediamine, tetramethylenediamine, hexamethylenediamine, octamethylenediamine, decamethylenediamine, m-xylyenediamine, p-xylylenediamine, 4,4'- diaminodicyclohexylmethane, piperazine, tolu-ylendiamine-(2,4), diaminodiphenylmethane-(4,4').

The polyesteramides were prepared by co-condensation or co-polymerization of the above mentioned polyamide components with hydroxy carboxylic acid or lactones or with equivalent amounts of a dicarboxylic acid and dihydroxy compounds. The following compounds are suitable: ε-hydroxy-caproic acid, β-hydroxyacetic acid, γ-butyrolactone, Δ-valerolactone, ethyleneglycol, butandiol-(1,4), 1,4-cyclohexanedicarbinol, 1,6-hexanediol, 2,2-dimethylpropanediol-(1,3), octanediol-(1,8), decanediol-(1,10).

The linear polyurethanes have a diamine- and a diol-component. The diamines and dihydroxy compounds as given above may be used in preparing the linear polyurethanes. The molecular weights of the polyamides, the polyesteramides and the polyurethanes are in the range of between 5000 and 50,000, preferably between 10,000 and 25,000.

Specially the polycarboxylic acid aryl esters having the general formulae:

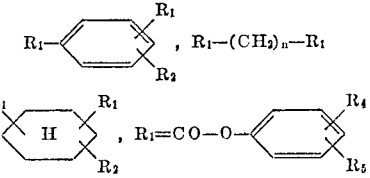

wherein $R_2$ stands for hydrogen, an alkyl-, cycloalkyl-, and aryl-, arylene and alkoxy group or halogen, or $R_1$; $R_4$ and $R_5$ mean hydrogen, an alkyl-, cycloalkyl-, aryl-, alkoxy group or halogen, and $n$ is a number between 2–12, may be used. The following esters are suitable: isophthalic acid diphenylester, isophthalic acid di-p-tert.butyl-phenylester, isophthalic acid di-p-nonyl-phenylester, terephthalic acid diphenylester, terephthalic acid di-p-cycloxylphenylester, terephthalic acid di-p-phenyl-phenylester, terephthalic acid di-m-chlor-phenylester, terephthalic acid di-m-methoxy-phenylester, 5-chloroisophthalic acid diphenylester, 5-methylisophthalic acid diphenylester, isophthalic acid-β-naphthylester, adipic acid diphenylester, sebacic acid diphenylester, hexahydroterephthalic acid diphenylester, pimelic acid diphenylester, succinic acid diphenylester, adipic acid-di-p-tert.-butyl-phenylester, adipic acid-di-m-chlorophenylester.

Preferably carbonic acid ester of the following formulae:

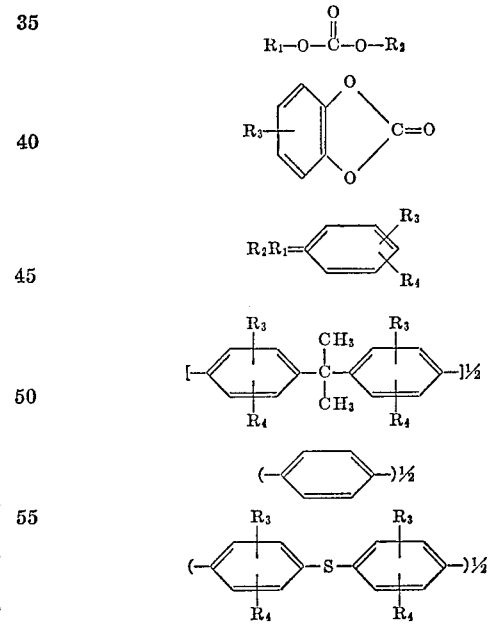

wherein $R_3$ and $R_4$ stand for hydrogen, halogen, an alkyl-cycloalkyl-, aryl-, arylene- or an alkoxy group.

Suitable compounds are carbonic acid diphenylester, carbonic acid di-p-tert.-butylphenylester, carbonic acid di-m-chlorophenylester, carbonic acid di-p-cyclohexylphenylester, carbonic acid di-p-phenyl-phenylester, carbonic acid di-β-naphthyl-ester, catechol-carbonate, 4-cyclohexyl-catechol-carbonate.

The mixed carboxylic acid esters may be prepared by reaction of a chloro carbonic acid ester of a polyhydric alcohol with equivalent amounts of a mono- or a polyhydric phenol or by reaction of a chloro carbonic acid ester of a mono- or a polyhydric phenol with equivalent amounts of a polyhydric alcohol. The reaction is carried out at a temperature of about −20° C. to about +30° C.

in the presence of acid binding agents such as pyridine, triethylamine, N,N-dimethylaniline, quinoline, potassium carbonate, sodium carbonate, potassium hydroxide or sodium hydroxide. The reaction may be effected in an organic solvent in the presence of a catalyst. As organic solvents ether, methylene chloride, benzene, toluene, and dioxane may be used. The obtained products may be purified by distillation or recrystallisation. Polyhydric alcohols of the formula

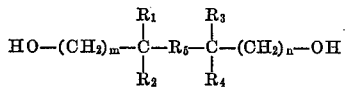

wherein $R_1$, $R_2$, $R_3$ and $R_4$ stand for hydrogen, $-(CH_2)_o-OH$, alkyl, cycloalkyl-, aryl-, $R_5$ stands for $-O-$, $-S-$, $-(CH_2)_p-$

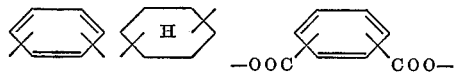

$m$, $n$, $o$ and $p$ mean a number from 0–6, or pentaerythritol, may be used.

Special compounds are: ethyleneglycol, butanediol-(1,4), hexanediol-(1,6), octanediol-(1,8), decanediol-(1,10), 2,2-dimethylpropanediol-(1,3), trimethylolpropane, glycerol, pentaerythritol, cyclohexanediol-(1,4).

The following phenols are suitable: phenol, 4-tert.butylphenol, 4-nonylphenol, 3-chlorophenol, 4-methoxyphenol, 4-cyclohexylphenol, β-naphthal, resorcinol, hydroquinone, dihydroxydiphenylalkane, dihydroxydiphenylsulfide and dihydroxydiphenylether.

Products are produced of a wide range of molecular weights ranging from products of a relatively low molecular weight, in some cases far less than about 4–5,000 to products of high molecular weight, all of which may be used in accordance with the invention with good results.

Extremely small amounts of the cross-linking agents, utilized in accordance with the invention, have proven highly effective for increasing the melt viscosity of the polymer, and amounts as low as 0.01% by weight based on the polymer, have proven effective and useful, though quantities between about 0.1 and 1% by weight based on the polymers are generally preferred. The melt viscosity of the polymer increases in direct proportion to the amount of the additive in accordance with the invention, and the upper limit of the amount which may be used is determined, as a practical matter, by the maximum viscosity desired or permissible.

The esters used as the melt viscosity increasing additive in accordance with the invention may be added to the polyamides, polyester amides, and polyurethanes in the conventional manner, either before, during, or after their production, and thus may be added before or during the condensation reactions which result in the formation of the polymers or may be added at any time thereafter provided that the same are ultimately incorporated in the melt. It has proven especially advantageous to mix the polymer in granulated form with the ester additives in accordance with the invention and to continuously melt the mixture for a short period of time in accordance with the method of German Patent 1,027,398.

In all other respects the production of the polymers and the articles therefrom are effected in the conventional manner, and it is, of course, possible to add other substances to the polymers in order to modify their properties. Thus, for example, the conventional anti-aging agents, stabilizers, pigments, dyes, fillers, fibers, plasticizers, metal powders, resins, and other synthetic and natural substances, parting agents, and the like may be added in the conventional manner, in the conventional amounts.

The polymer melts obtained in accordance with the invention have a uniform viscosity of a sufficiently high value to be outstandingly well suited for use in fabrication techniques for production of articles, as for example, extrusion, particularly blow molding. With the use of the melt viscosity increasing additives in accordance with the invention, an excessively rapid increase in viscosity is avoided, and there is no formation of decomposition products, side reactions, bubble formations, nor discolorations. Furthermore, the invention has the additional advantage in that the additives used in accordance therewith are completely compatible with the polymers, i.e. the polyamides, polyester amides, and polyurethanes, so that they distribute themselves quite uniformly in the melted mass. Aside from being highly compatible, certain of the esters additionally act as plasticizing agents or stabilizers for the polymers.

The polymers with the increased melt viscosity in accordance with the invention may be worked up without difficulty into extruded shapes of all types, such as tubes or rods, and into large blown bodies, as well as sheets for blow molding, vacuum molding, deep-drawing, and the like.

The following examples are given by way of illustration and not limitation:

Example 1

1000 parts by weight of poly-ε-caprolactam granules with a relative viscosity of 4.18, measured in a 1% solution in m-cresol at 25° C., and with a viscosity of 20,000 poises in the melted state at 250° C., are thoroughly mixed in a closed flask with 2.2 weight-parts of diphenylcarbonate by rolling for 2 hours on a roller mixer. The mixture is then melted in a worm press at 250–260° C. by the process of German Patent 1,027,398. The melted mass coming out of the press is perfectly homogeneous and free of bubbles and striae. The relative viscosity has increased to 5.17 and the fused viscosity at 250° C. has risen to 56,000 poises.

When 4.3 weight-parts of diphenylcarbonate are added instead of 2.2 weight-parts, a product is obtained with a relative viscosity of 6.06 and with a melt viscosity at 250° C. of 100,000 poises. When 6.5 parts by weight of carbonic acid diphenyl ester are added, the relative viscosity rises to 7.50, and the melt viscosity at 250° C. to 340,000 poises.

Example 2

The procedure is as in Example 1, but with the addition of 6.6 weight-parts of di-tert.butylphenyl-carbonate. A product is obtained with a relative viscosity of 6.25 and a melt viscosity of 150,000 poises at 250° C.

Example 3

The procedure is as in Example 1, but 14.2 weight-parts of sebacic acid diphenyl ester are added. The relative viscosity of the product obtained amounts to 4.97, and the viscosity in the melted state at 250° C. to 6,000 poises.

Example 4

1000 weight-parts of granulated poly-ε-caprolactam of a relative viscosity of 4.12 (measured in a 1% solution in m-cresol at 25° C.) and with a viscosity of 24,000 poises at 250° C., are thoroughly mixed in a closed flask with 3.6 weight-parts of hexanediol (1,6)-bis-phenylcarbonate by three hours of rolling on a roller mixer. The granulated product is then meltted in a worm press at 240° C. by the method of German Patent 1,027,393. The melted product coming from the press is perfectly homogeneous and free of bubbles and striae. The relative viscosity then amounts to 4.96, and the viscosity in the melted state at 250° C. amounts to 79,000 poises. If 7.2 weight-parts of hexanediol (1,6)-bis-phenylcarbonate are added instead of 3.6 weight-parts, a product is obtained with a relative viscosity of 5.56 and a viscosity in the melted state at 250° C. of 122,000 poises.

Example 5

The procedure is the same as in Example 4, but 6.8 weight-parts of 2,2,-dimethylpropanediol-1,3-bis-(phenylcarbonate) are added. A product is obtained with a relative viscosity of 6.07 and with a viscosity at 250° C. of 191,000 poises.

Example 6

The procedure is the same as in Example 4 but 5.0 weight-parts of trimethylolpropanetrisphenyl - carbonate are added. The relative viscosity of the product obtained amounts to 5.86, and the viscosity at 250° C. is 145,000 poises.

Example 7

In a manner analogous to Example 3, 6.4 parts by weight of diphenyl terephthalate is incorporated as the viscosity increasing additive. The relative viscosity of the product is 5.35 and the melt viscosity is 62,000 poises at 250° C.

Example 8

In a manner analogous to Example 3, 12.8 parts by weight of diphenyl isophthalate is incorporated as the viscosity increasing additive. The relative viscosity of the product is 5.14 and the melt viscosity is 58,000 poises at 250° C.

Example 9

Example 1 is repeated with a copolymer of ε-caprolactam, p-hydroxybenzoic acid, terephthalic acid and ethylene glycol. The polymer had a relative viscosity of 2.5 measured in a 1% solution in m-cresol at 25° C. and a viscosity of 10,000 poises when melted at 250° C. The viscosity improver is diphenylcarbonate. Upon incorporation of the viscosity improver, the composition has a relative viscosity of 3.0 and a melt viscosity of 18,000 poises.

Example 10

Example 1 is repeated with a polyurethane of hexamethylene diisocyanate and 1.6-hexanediol. The polymer has a melt viscosity of 2,000 poises at 200° C. The viscosity improver is diphenylcarbonate. Upon incorporation of the viscosity improver the composition has a melt viscosity of 5,000 poises at 200° C.

While the invention has been described in detail with reference to certain specific embodiments, various changes and modifications which fall within the spirit of the invention and scope of the appended claims will become apparent to the skilled artisan. The invention is, therefore, only intended to be limited by the appended claims or their equivalents.

What we claim is:

1. A mixture of a polyamide with about 0.1 to 1.0 weight percent of at least one ester having as the acid moiety thereof at least one member selected from the group consisting of carbonic acid and cyclic hydrocarbon dicarboxylic acids and hydroxyl-bearing moiety selected from the group consisting of monohydric phenols and in the case of carbonic acid further of polyhydric aliphatic alcohols and polyhydric phenols.

2. A mixture as claimed in claim 1, wherein said polyamide is a polyester amide.

3. A mixture as claimed in claim 1, wherein said polyamide is a polyurethane.

4. A mixture as claimed in claim 1, wherein said hydroxyl-bearing moiety is at least one selected from the group consisting of at least one aromatic hydroxyl-bearing moiety selected from the group consisting of phenol; 4-t-butyl phenol; 4-n-nonyl phenol; cyclohexyl catechol; 2,2-bis-(4-hydroxyphenyl)propane; 2,2-bis(4-hydroxy-3-isooctyl phenyl)-propane; 4,4'-dihydroxy-3,3'-diisooctyl-diphenyl sulfide; 3-pentadecyl phenol; 4-hydroxybenzoic acid ethyl ester; β-naphthol; 4-methoxy phenol; 4,4'-dihydroxy phenyl sulfide, m-chlorophenyl; di-(p-cyclohexyl)phenol; di-p-phenyl-phenol; catechol; resorcinol; hydroquinone; dihydroxydiphenyl ether; 4 - cyclohexyl phenol; and a mixture of said aromatic hydroxyl-bearing moiety, and wherein said acid is a carbonic acid at least one aliphatic hydrocarbon hydroxyl-bearing moiety selected from the group consisting of ethylene glycol; 1,6-hexanediol; 2,2-dimethylpropanol-(1,3); 4-butane-diol; 1,1,1-trimethylolpropane; pentaerythritol; 1,4 - cyclohexanediol; 1,8-octanediol; 1,10-decanediol and glycerol.

5. A mixture as claimed in claim 1, wherein said polyamide is poly-ε-caprolactam and said ester is at least one from the group consisting of diphenylcarbonate; di-t-butyl-phenylcarbonate, hexanediol - (1,6) - bis - phenylcarbonate, 2,2 - dimethylpropanediol - 1,3 - bis - (phenylcarbonate) and trimethylolpropanetrisphenylcarbonate.

6. A mixture according to claim 1 in which said polymer is poly-ε-caprolactam.

References Cited

UNITED STATES PATENTS 2,483,514   10/1949   Allen et al. _____ 260—78
2,557,808    6/1951   Walker _____ 260—78

WILLIAM H. SHORT, *Primary Examiner.*

H. D. ANDERSON, *Assistant Examiner.*